(12) United States Patent
Key

(10) Patent No.: US 10,159,857 B2
(45) Date of Patent: Dec. 25, 2018

(54) PERSONAL AIR FILTRATION APPARATUS AND METHOD

(71) Applicant: Paul Key, Tucson, AZ (US)

(72) Inventor: Paul Key, Tucson, AZ (US)

(*) Notice: Subject to any disclaimer, the term of this patent is extended or adjusted under 35 U.S.C. 154(b) by 479 days.

(21) Appl. No.: 15/058,626

(22) Filed: Mar. 2, 2016

(65) Prior Publication Data

US 2017/0252588 A1    Sep. 7, 2017

(51) Int. Cl.
| | |
|---|---|
| *A62B 23/02* | (2006.01) |
| *B01D 46/00* | (2006.01) |
| *B01D 46/24* | (2006.01) |
| *A62B 9/02* | (2006.01) |
| *A62B 9/06* | (2006.01) |
| *A63B 71/08* | (2006.01) |

(52) U.S. Cl.
CPC ............... *A62B 23/02* (2013.01); *A62B 9/02* (2013.01); *A62B 9/06* (2013.01); *A63B 71/085* (2013.01); *B01D 46/0002* (2013.01); *B01D 46/0024* (2013.01); *B01D 46/0038* (2013.01); *B01D 46/0089* (2013.01); *B01D 46/2403* (2013.01)

(58) Field of Classification Search
CPC .. A62B 23/02; A62B 9/02; A62B 9/00; A62B 9/022; A62B 9/06; A62B 18/00; A62B 7/12; A62B 7/00; B63C 11/18; B63C 11/22; B63C 11/02; B63C 11/14; B63C 11/16; B63C 11/12; B63C 2011/165; B63C 11/186; A63B 71/085; B01D 46/0002; B01D 46/00024; B01D 46/0038; B01D 46/00089; B01D 46/2403; A61F 9/068; A61F 9/04; A61F 9/06; A41D 13/1161; A41D 13/1184; A41D 13/00; A42B 3/28; A42B 3/24
See application file for complete search history.

(56) References Cited

U.S. PATENT DOCUMENTS

| | | |
|---|---|---|
| 4,071,026 A | 1/1978 | Bevins |
| 4,207,882 A | 6/1980 | Lemere |

(Continued)

FOREIGN PATENT DOCUMENTS

DE    8618498 U1    11/1986

OTHER PUBLICATIONS

Duxbury, James Neil, "Personal respirator," ProQuest Dialog, Jan. 29, 2015.

*Primary Examiner* — (Jackie) Tan-Uyen T Ho
*Assistant Examiner* — Cana Gallegos
(74) *Attorney, Agent, or Firm* — Michael J. Curley; Quarles & Brady LLP

(57) ABSTRACT

An apparatus and methods for air filtration are disclosed. The apparatus includes a body and first and second replaceable filters. The body of the apparatus further contains an air-exchange assembly and a filter receiver attached to the air exchange assembly. The air-exchange assembly contains an exhaust tube with an open end and a closed end, two wings on opposite sides of the exhaust tube, and an intake check valve and an exhaust check valve inside the exhaust tube. The first replaceable filter surrounds the filter receiver; and the second replaceable filter is inside the filter receiver. Several apertures and the check valves are strategically disposed in the exhaust tube to achieve optimal air filtration and avoid contamination of a user's exhaust.

17 Claims, 7 Drawing Sheets

(56) References Cited

U.S. PATENT DOCUMENTS

| | | | |
|---|---|---|---|
| 4,590,951 | A | 5/1986 | O'Connor |
| 4,677,976 | A | 7/1987 | Fujinuma et al. |
| 5,315,987 | A | 5/1994 | Swann |
| 5,771,885 | A | 6/1998 | Putrello |
| 6,460,539 | B1 | 10/2002 | Japuntich et al. |
| 6,758,212 | B2 | 7/2004 | Swann |
| 6,971,386 | B2 | 12/2005 | Duxbury |
| 7,025,060 | B1 | 4/2006 | Nicholson |
| 8,590,533 | B2 | 11/2013 | Danford |
| 8,919,340 | B2 | 12/2014 | Blum |
| 2004/0007234 | A1 | 1/2004 | Duxbury |
| 2011/0030691 | A1 | 2/2011 | Campbell |
| 2012/0247474 | A1 | 10/2012 | Torbenson |
| 2017/0050058 | A1* | 2/2017 | Konrad .................. A62B 23/02 |
| 2018/0043191 | A1* | 2/2018 | Huberty ............... B01D 46/523 |

* cited by examiner

PERSONAL AIR FILTRATION APPARATUS AND METHOD

BACKGROUND OF THE INVENTION

People use air filtration apparatuses when exercising and performing other aerobic activities outdoors, especially, when air quality is worrisome. However, a filter suitable for high impact sport activities that can fit comfortably and securely under a helmet is not present in the market.

Most air filtration devices in the market today cannot fit comfortably under any helmet. During high impact activities, it would be desirable to provide a personal air filtration device capable of being fastened securely, and which offers certain protection for a user at the same time. This present invention includes these advantages and enables optimal air filtration in a package dimensioned to fit under various types of helmets worn by different users in different types of environments.

SUMMARY OF THE INVENTION

Embodiments of the invention provide an apparatus and methods for air filtration. The apparatus includes a body and first and second replaceable filters. The body of the apparatus contains (i) an air-exchange assembly having an exhaust tube with an open end and a closed end, two wings on opposite sides of the exhaust tube, and an intake check valve and an exhaust check valve inside the exhaust tube; and (ii) a filter receiver attached to the air exchange assembly. The first replaceable filter surrounds the filter receiver and the second replaceable filter fills inside the filter receiver. In such apparatus, the exhaust tube includes a first aperture in a side of a wall of the exhaust tube near the closed end, a second aperture in another side (of the wall of the exhaust tube) that connects to the first wing, and a third aperture in another side (of the wall of the exhaust tube) that connects to the second wing. Further, the filter receiver contains at least one perforation to allow the exchange of air.

An embodiment of the present invention includes a breather tube having a first open end and a second open end. The breather tube is connected, at such first open end, to the first aperture to establish air exchange between the first open end and the second open end through the exhaust tube.

Another embodiment of the present invention includes a mouthpiece with at least one flange that is configured to fit in between a plurality of teeth. As a result, a user can securely hold on to the mouthpiece. A threaded portion of the mouthpiece also forms an air-tight connection to a threaded portion of the breather tube.

Illustrated in certain embodiments, the apparatus can be adjusted in several ways to conform to a contour of a user's mouth and chin and to fit underneath a helmet. For example, the angles of the wings attached to the exhaust tube can be adjusted; and the width of the wings and the filter receiver can be adjusted; and the distance between the mouthpiece and the body of the apparatus can be elongated or shortened.

Illustrated in certain embodiments, the apparatus is configured to have only an intake check valve open so that a user can breathe in air through filters and the intake check valve. When a user exhales, the apparatus is configured to have only an exhaust check valve open so the user can breathe out exhaust through the exhaust check valve and the exhaust tube. Further, due to the configuration of the two check valves, exhaled exhaust is not rebreathed by the user.

A user can utilize this apparatus with different configurations for various activities in different types of environment. For example, during bike racing or commuting, a bike rider can use this apparatus to filter out exhaust from cars and other motorcycles; a dirt bike rider can use this apparatus to filter out dust and particles of dirt; during exercise, a user can use this apparatus to breathe in cleaner air and prevent condensate build-up on the filters; and a welder can use this apparatus to protect himself or herself from welding gases and smoke.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

Figure 1:
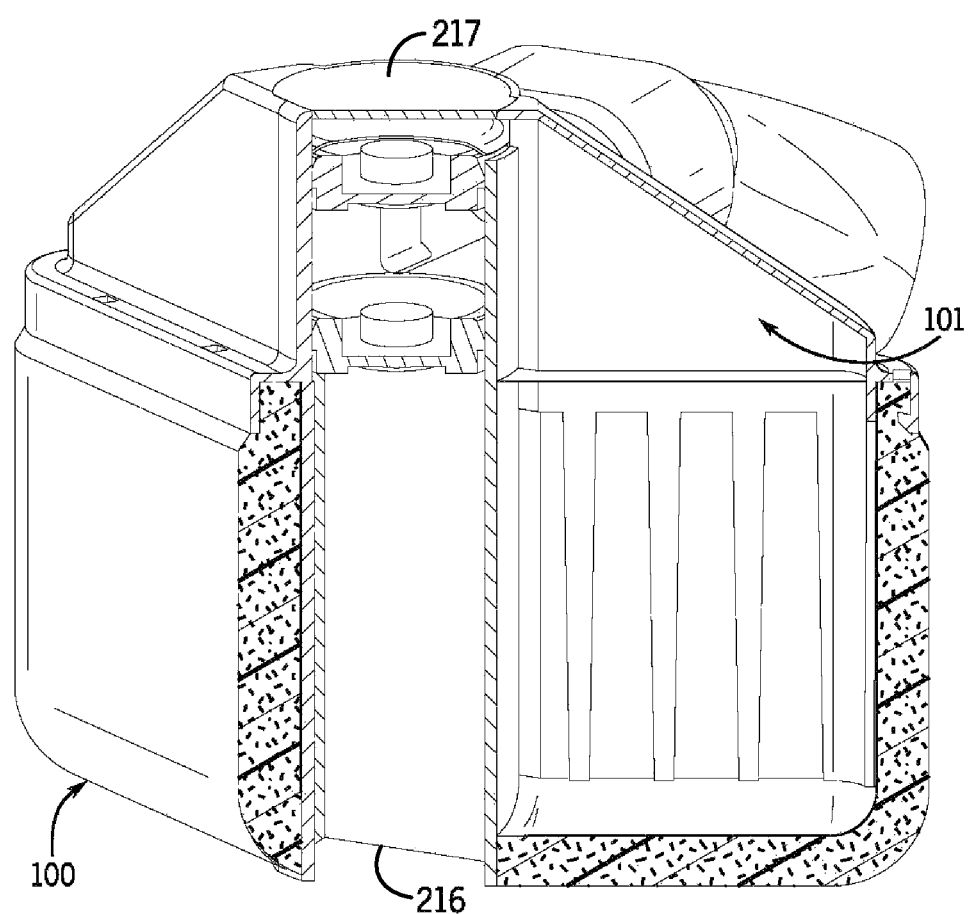
FIG. 1 is a partially sectional view of a personal air filtration apparatus.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

In addition, the following disclosure may describe features of the invention with reference to corresponding drawings, in which like numbers represent the same or similar elements wherever possible. In the drawings, the depicted structural elements are generally not to scale, and certain components are enlarged relative to the other components for purposes of emphasis and understanding. It is to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may not be shown in a given drawing or described in detail to avoid obscuring aspects of an embodiment of the invention that are being discussed.

The invention as recited in claims appended to this disclosure is intended to be assessed in light of the disclosure as a whole. The present invention discloses an air filtration apparatus and methods for air filtration. The apparatus can be configured for various types of activities, various types of environment, and various different types of users.

Figure 2:
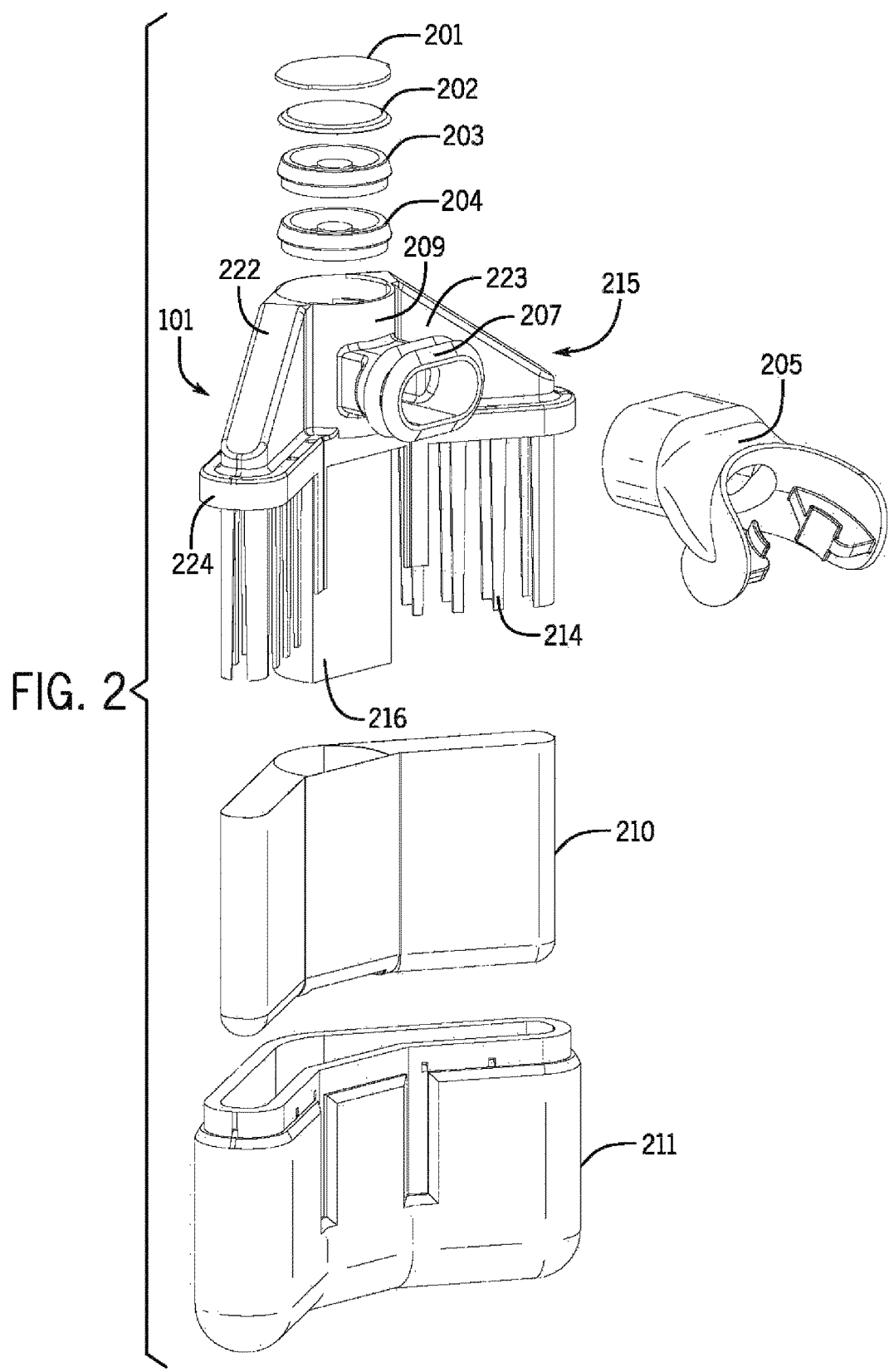
FIG. 2 is an exploded view of the personal air filtration apparatus.
Figure 3:
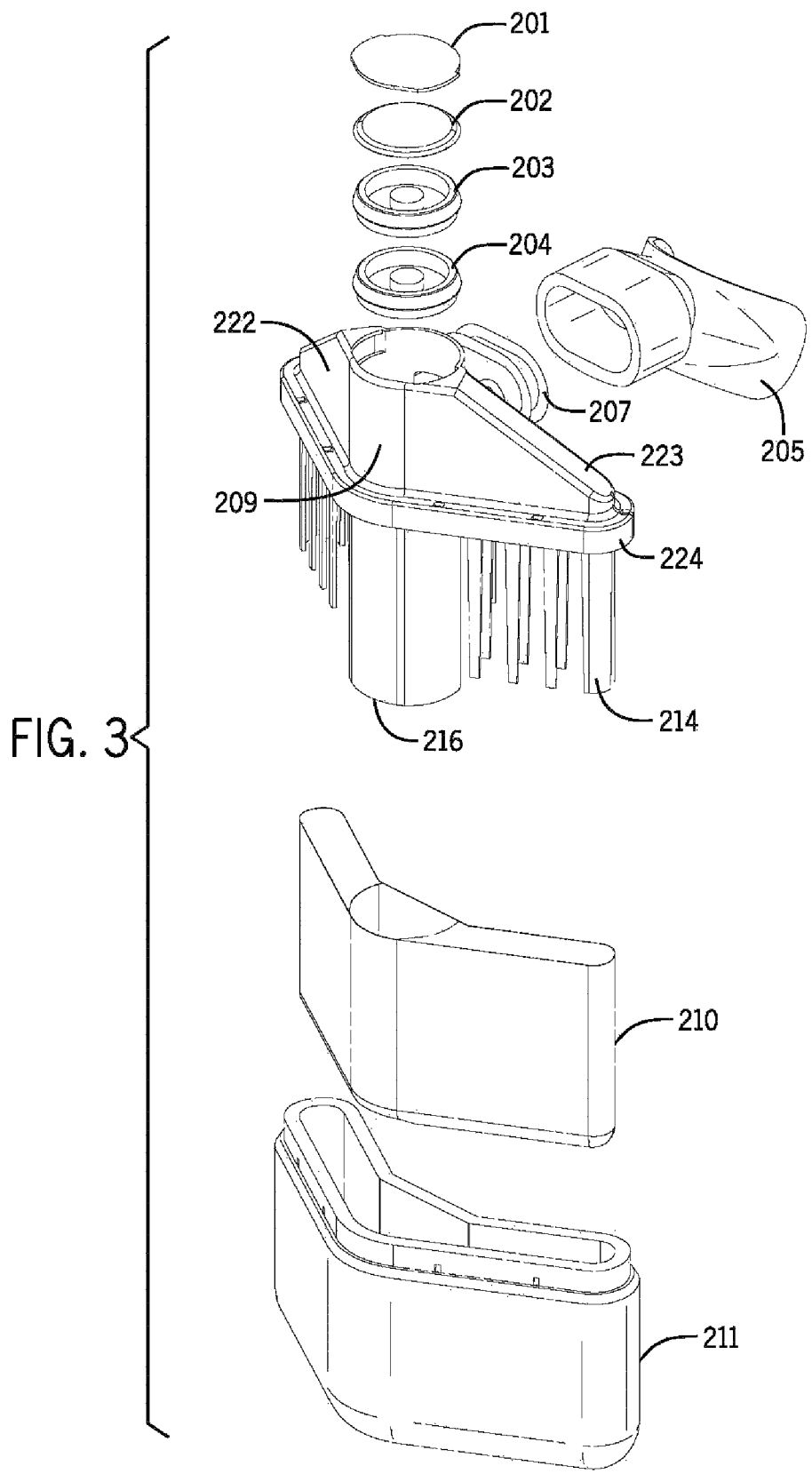
FIG. 3 is another perspective of the exploded view of the personal air filtration apparatus.
Figure 8:
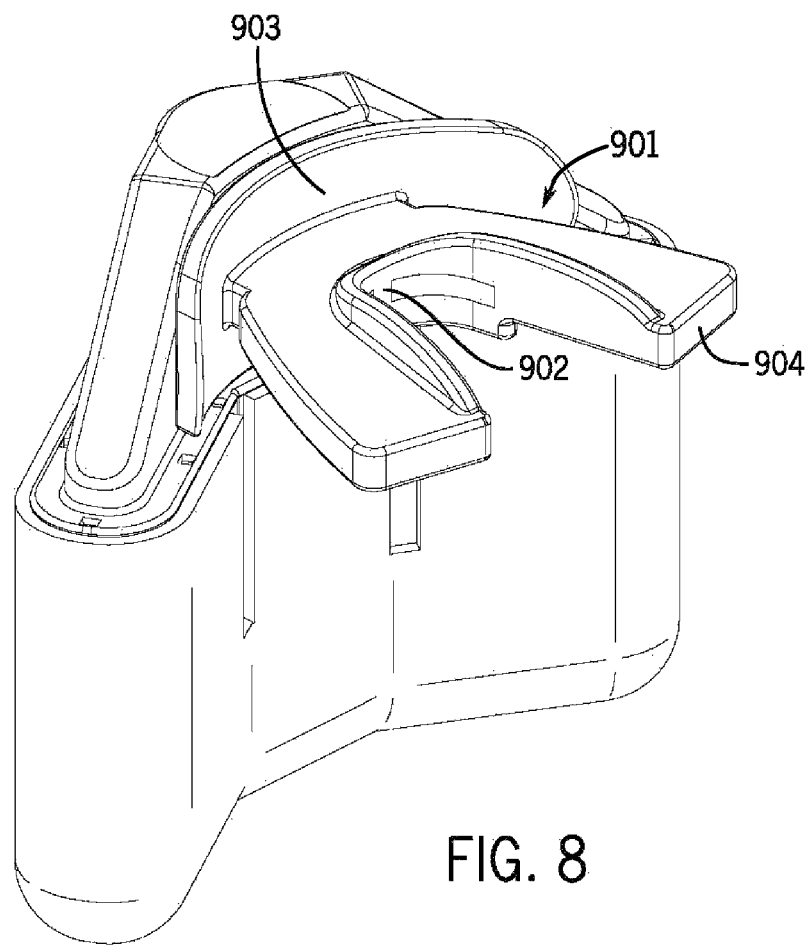
FIG. 8 is an illustration of a different configuration of the air filtration apparatus.

FIGS. 1-3 illustrate one embodiment of a personal air filtration apparatus 100. A body 101 includes an air-exchange assembly 215, an interior filter 210, an exterior filter 211, a filter receiver 214, and a breather tube 207. FIG. 8 illustrates another embodiment of apparatus 100 wherein a breather tube is optional. The air-exchange assembly 215 further includes an exhaust tube 209 with an open end 216 and a closed end 217 and structures shaped like wings attached to the exhaust tube. The exhaust tube extends from one end of apparatus 100 to the other end of apparatus 100.

In the illustrated embodiment of FIG. 2, the body 101 is configured to conform to an inner dimensionality of a helmet. Wing 222 and wing 223 are shaped as planar right triangles, wherein each triangle has one 90° interior angle. Both wings are hollow inside so that when they connect to filter receiver 214, airflow can pass through them easily. In certain embodiments, the right triangles can also be isosceles triangles. One side of the right triangle wing is attached to the exhaust tube, whereas the other side of the right triangle wing is attached to a platform 224, which is located perpendicular to the exhaust tube. Platform 224 further comprises a ledge surrounding wing 222 and 223. In the three-dimensional space surrounding the exhaust tube, wing 222 can be adjusted to rotate away from a y-z plane, which contains the exhaust tube. The y-z plane is orthogonal to an x-y plane, which is formed by an x-axis and a y-axis and contains platform 224. Subsequently, wing 223 may be optionally adjusted to be attached to the exhaust tube symmetrically to wing 222.

In certain embodiments, the attachment between wings 222 and 223 and the exhaust tube is fixed. In certain embodiments, the attachment between wings 222 and 223 and the exhaust tube is adjustable. Methods known to the person having ordinary skill in the art can be utilized to attach adjustable wings to the exhaust tube, for example, by providing a flexible material at the zone of intersection between wings 222, 223 and exhaust tube 209. Further, in some embodiments, the width of each wing can be adjusted to fit underneath a helmet.

In certain embodiments, filter receiver 214 is configured to fasten to platform 224 securely and can be removed from body 101. In certain embodiments, filter receiver 214 is fixedly attach to platform 224 and is an inseparable part of body 101.

Referring to FIGS. 2 and 3, in some embodiments, a thickness of filter receiver 214 can be increased or decreased to fit under a helmet. The thicker the filter receiver, the thicker the filters, then the bigger the surface area that the filters can provide for filtration.

Further, filter receiver 214 is configured with at least one perforation to allow ingress of ambient air through an interior filter 210 and an exterior filter 211. The perforation located in the walls of filter receiver 214 can be shaped as circular, rectangular, triangle, or any other geometric shapes, or a mixture thereof that allow exchange of air. Further, interior filter 210 and exterior filter 211 are, in some embodiments, replaceable.

Depending on the need of a user, the user can select appropriate interior filter and exterior filter accordingly. For example, in some embodiments, the user is a welder and he/she would select appropriate interior and exterior filters to filter out the toxic welding gases. In some other embodiments, the ambient air is dusty and filled with small size particles, such as, pollen, dirt, mold, pet dander, bacteria, dust mite debris, smoke, or the like, the user can select appropriate interior and exterior filters for effective filtering of dust and small size particles. In some embodiments, interior filter 210 and exterior filter 211 can be impregnated with carbon to remove chemical fumes, gases, cigarette smokes, and odors. Additionally, in some embodiments, the width of the filter receiver can be adjusted according to the width of the wings; the shape of the filter receiver is configured accordingly to fasten to the wings. Illustrated in FIGS. 2 and 3, the surface area of the filters is larger than most conventional personal filters to provide optimal air filtration.

In some embodiments, the filter receiver 214 is configured to contour to a user's mouth and chin. Subsequently, both the filters 210 and 211 are configured to contour to a user's mouth and chin. As a result, the air filtration apparatus 100 can fit under a helmet in the most comfortable way. At the same time, the size of the filters is large enough to cover the user's mouth and chin and to provide sufficient surface for an optimal filtration.

Referring to FIGS. 1-3 and 6, exhaust tube 209 has an open end 216; a closed end 217; an aperture 212, which is located closer to closed end 217 and on a side of a wall of the exhaust tube 209; an aperture 218, which is located on another side of the wall attached to wing 222; an aperture 219, which is located on an opposite side of the wall (compared to the disposition of aperture 218) attached to wing 223. Further, all three apertures are disposed above platform 224. Moreover, apertures 218 and 219 are disposed above or immediately above the intake check valve 203. In certain embodiments, apertures 218 and 219 are disposed perpendicularly to aperture 212. Further, the disposition of aperture 218 is parallel to the disposition of aperture 219. Moreover, all three apertures are disposed closer to closed end 217 of the exhaust tube, so that the outside ambient air travels all the way through filters before it enters the intake check valve.

The intake check valve 203 is arranged right at or immediately above top 220 of aperture 212, whereas, the exhaust check valve 204 is arranged right at or immediately below bottom 221 of aperture 212. The phrase "immediately above" means that intake check valve 203 is disposed about 1 cm above the top of the aperture. Similarly, the phrase "immediately below" means that exhaust check valve 204 is disposed about 1 cm from the bottom of the aperture. Neither of these dimensions should be construed as limiting on the invention. Intake check valves and exhaust check valves with suitable cracking pressures are selected to be disposed inside exhaust tube 209. Suitable cracking pressures for an intake check valve mean that intake check valve 203 allows gas to flow in under a negative pressure induced by a typical inhalation restricted by filters 210 and 211 and the cross sectional area of the interior passages of wings 222 and 223. Further, suitable cracking pressure for an exhaust check valve mean that exhaust check valve 204 allows gas to follow out under a positive pressure induced by a typical exhalation from exhaust tube 209. Therefore, a user can breathe in and out comfortably wearing apparatus 100.

In some embodiments, a circular screen 202 locates above the intake check valve 203 to block particles that pass through both interior filter 210 and exterior filter 211. Referring to FIG. 2, a circular lid 201 is disposed to seal closed end 217 of exhaust tube 209 after assembly of both intake and exhaust check valves with or without the circular screen 202 disposed above the intake check valve 203. Further, referring to FIG. 6, the aperture 218 is located on the side of the wall attaching to wing 222 and the aperture 219 is located on the side of the wall attaching to wing 223. Both aperture 218 and aperture 219 are disposed right next to or immediately underneath circular lid 201. The phrase "immediately underneath" means that apertures 218 and 219 are disposed about 1 cm above circular lid 201.

Figure 4:
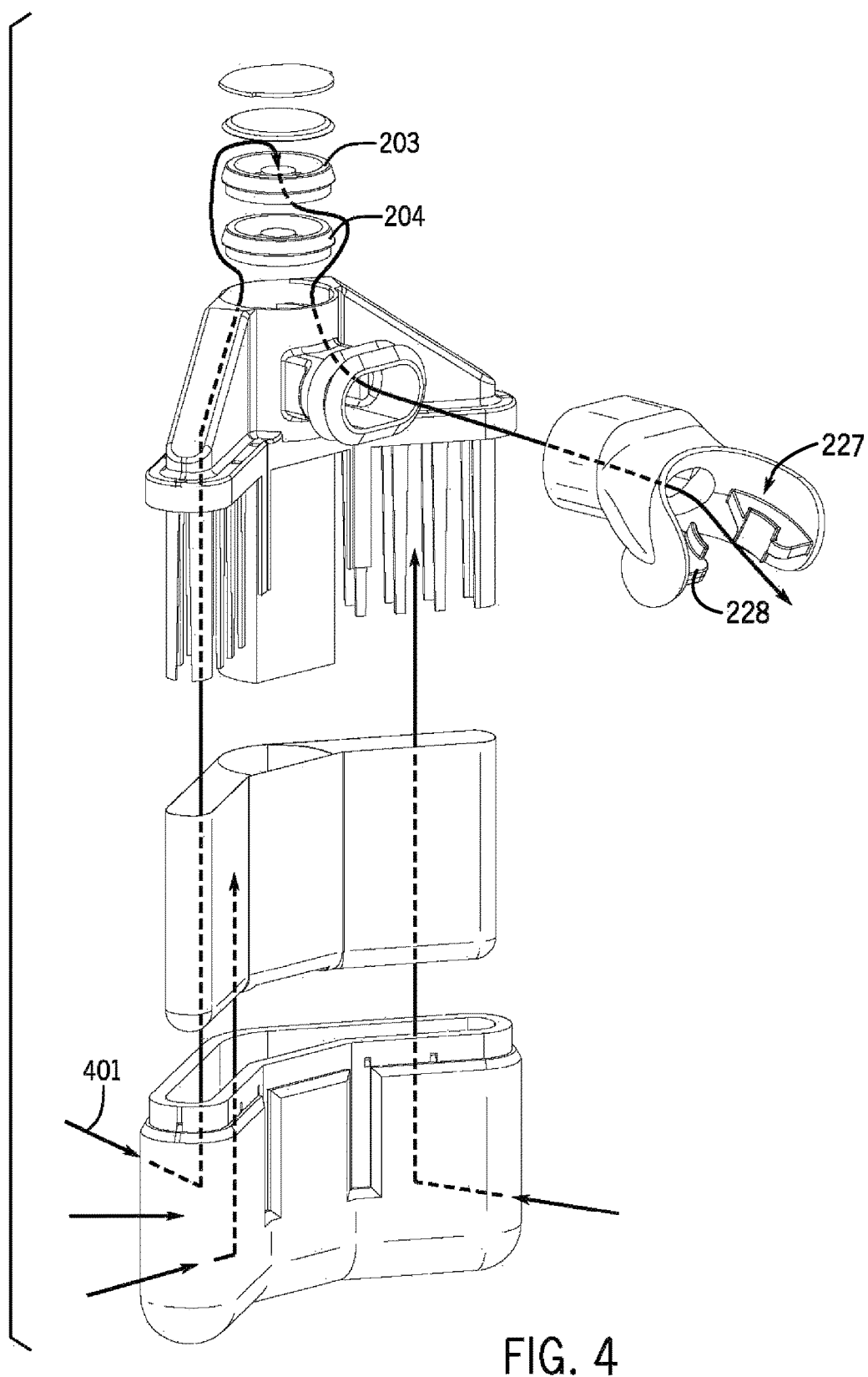
FIG. 4 is a schematic view of unidirectional ingress of ambient air through filters, an intake check valve, breather tube, and mouthpiece during an inhale phrase.

Referring to FIG. 4, during an inhale phase, a unidirectional laminar ingress flow 401 of outside ambient air is created by the user. Specially, the outside ambient air travels through exterior filter 211, interior filter 210, wings 222 and 223, and finally through apertures 218 and 219 into the upper portion of exhaust tube 209. The unidirectional airflow 401 travels through intake check valve 203, then through an optional breather tube 207, finally entering into a mouthpiece 205. After unidirectional airflow 401 travels through intake check valve 203, the intake check valve will be resealed and the airflow cannot flow back out through the intake check valve. Further, unidirectional airflow 401 will not generate enough pressure to open exhaust check valve 204, therefore, the unidirectional air flow cannot escape through the exhaust check valve and can only flow through optional breather tube 207 and mouthpiece 205. Different types of check valves suitable for airflow are known to the person of ordinary skill in the art.

Figure 5:
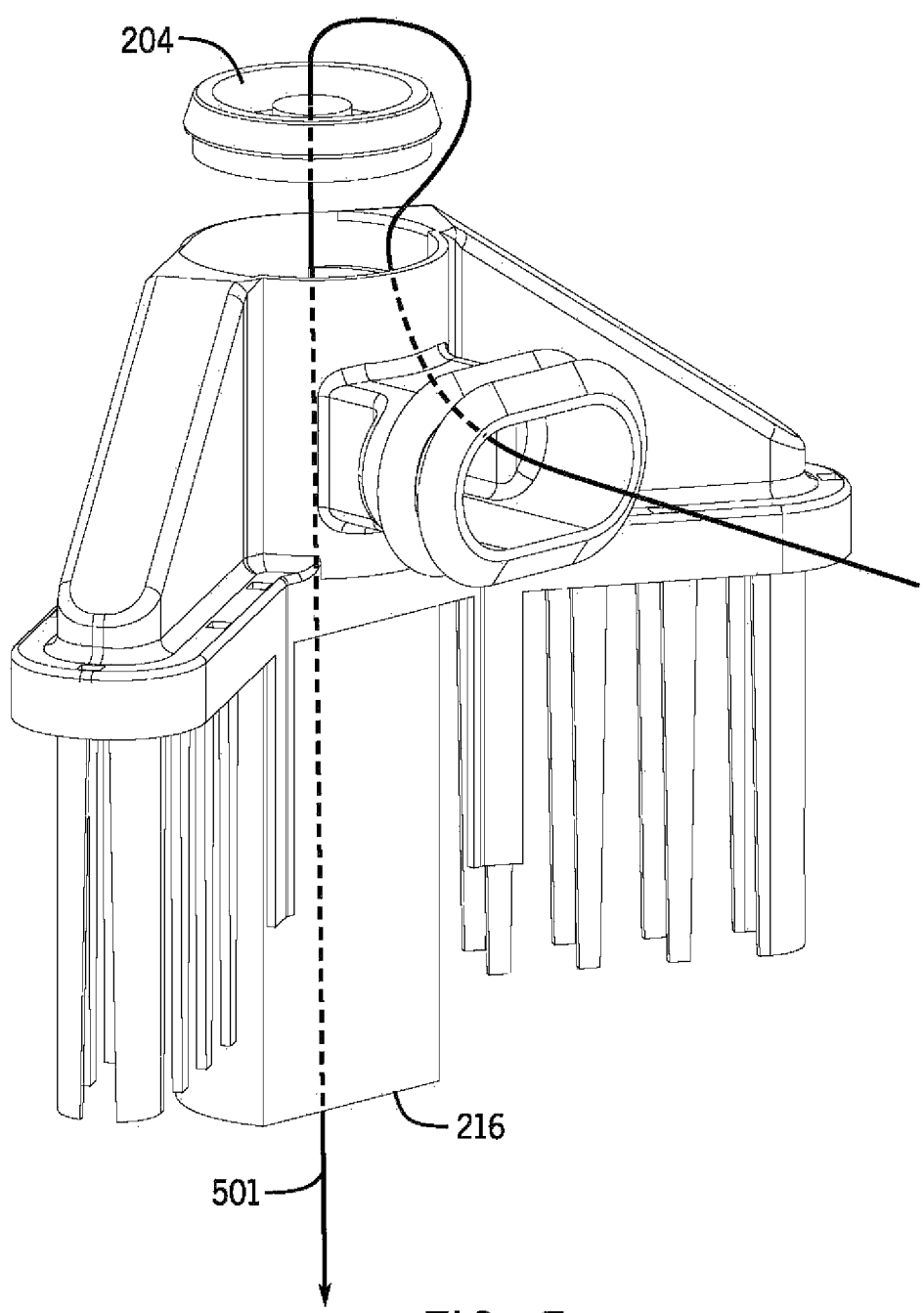
FIG. 5 is a schematic view of unidirectional egress of exhaust from a mouthpiece, through an exhaust check valve and an exhaust tube, to outside of the air filtration apparatus.
Figure 6:
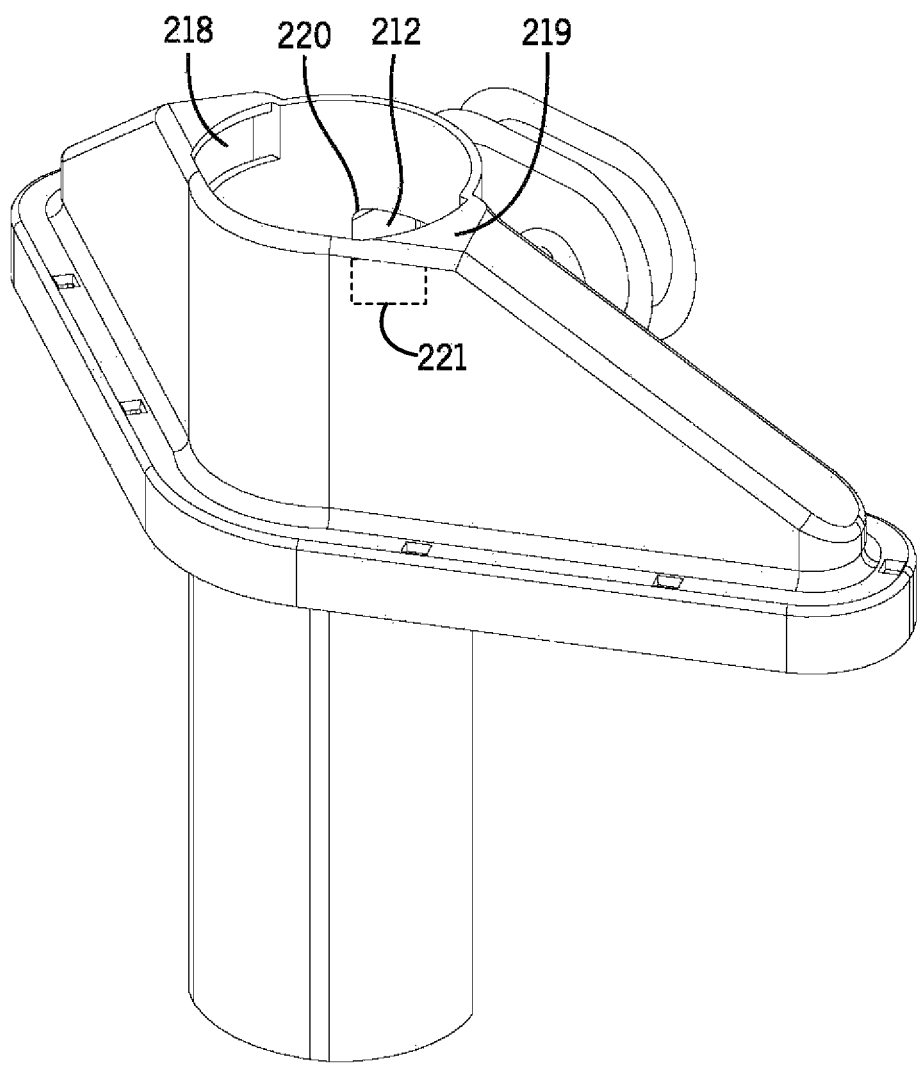
FIG. 6 is an upper perspective of an air-exchange assembly of the personal air filtration apparatus without filters.

Referring to FIG. 5, during an exhale phase, a unidirectional laminar egress flow 501 is created by the user. Specifically, the exhaust exhaled by the user travels through mouthpiece 205 and optional breather tube 207 into the exhaust tube, finally out through open end 216. Due to the position of the exhaust check valve, exhaust flow 501 travels a short distance, which is from aperture 225 or aperture 902 to the exhaust check valve, before the flow reaches exhaust check valve 204. The exhaust check valve opens when the positive pressure generated by exhaust flow 501 reaches the exhaust check valve's cracking pressure. Intake check valve 203 remains closed, therefore, the exhaust egress is not able to re-enter air exchange assembly 215 when a user exhales out exhaust. As a result, the exhaust will not contaminate the interior and the exterior filters. More specifically, when the temperature difference is large between the ambient air and a user's exhaust, both the filters are prevented from condensate build-up. Further, in some embodiments, the distance between the intake check valve and the exhaust check valve is short enough that during the next inhale phase, most of the exhaust from the last exhale phase has already vented. Thus, a user does not breathe in the lingering exhaust from the last exhale phase.

Figure 7:
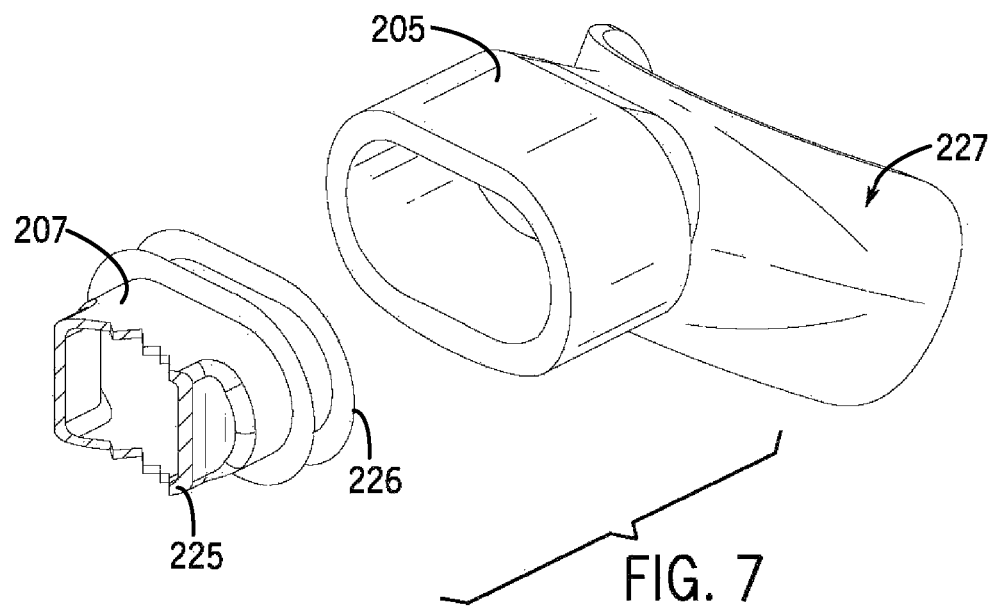
FIG. 7 is a view of a breather tube and a mouthpiece.

FIG. 7 illustrates a breather tube 207 with both open ends, one end 225 connects to exhaust tube 209 via aperture 212, other open end 226 connects to mouthpiece 205 via an aperture 225. In some embodiments, breather tube 207 and a connecting portion of mouthpiece 205 are both threaded. Further, the threaded portion of breather tube 207 mates with the threaded portion of mouthpiece 205 to ensure secure attachment. Moreover, the threaded portion of mouthpiece 205 can move along the threaded portion of breather tube 207, as a result, the distance between the body and the mouthpiece can be elongated or shortened. Other methods known to the person having ordinary skill in the art can be applied to fasten the breather tube and the mouthpiece securely and to adjust the mouthpiece along the breather tube.

In some embodiments, the attachment between breather tube 207 and body 101 and the attachment between mouthpiece 205 and breather tube 207 are air-tight in order to limit permeation of unfiltered ambient air.

Further, referring to FIGS. 4 and 7, mouthpiece 205 includes a lip protection portion 227, a teeth engagement portion connected to and disposed posterior to the lip protection portion. Further, the teeth engagement portion contains a plurality of teeth biting flanges 228 protruding radially outwardly from the lip protection portion. The lip protection portion is configured to cover a lip or both lips of a user in order to protect the teeth, oral tissue, and gums from impact and abrasion. In addition, the plurality of teeth biting flanges not only offer a way for the user to securely and tightly connect to the mouthpiece, but also provide protection for teeth from impact and abrasion.

Additionally, referring to FIG. 8, mouthpiece 901 is connected directly to air-exchange unit 215 through aperture 212. In this illustrated embodiment, the size and shape of aperture 212, which is disposed in the wall of the exhaust tube, matches the size and shape of an aperture 902, which is disposed in the mouthpiece. Further, mouthpiece 901 comprises a lip protection portion 903 and a teeth biting strip 904 connected to and disposed posterior to the lip protection portion. Both the lip protection portion and the teeth biting strip are configured to protect lips, teeth, oral tissue, and gums from impact and abrasion.

In some embodiments, durable and lightweight materials are utilized to build the current invention. When the air filtration apparatus is both durable and light, the apparatus satisfies many needs in different types of activities.

While the preferred embodiments of the present invention have been illustrated in detail, it should be apparent that modifications and adaptations to those embodiments may occur to one skilled in the art without departing from the scope of the present invention.

I claim:

1. An apparatus for air filtration, comprising:
    a body including:
        an air-exchange assembly having an exhaust tube with an open end and a closed end, two wings on opposite sides of said exhaust tube, and an intake check valve and an exhaust check valve disposed inside said exhaust tube;
        a filter receiver attaching to said air exchange assembly,
    a first replaceable filter surrounding said filter receiver; and
    a second replaceable filter disposed inside said filter receiver;
        wherein said exhaust tube includes a first aperture in a side of a wall of the exhaust tube near said closed end, second aperture in another side of the wall of the exhaust tube connecting to said first wing, and third aperture in another side of the wall of the exhaust tube connecting to said second wing.

2. The apparatus of claim 1, further comprising a breather tube connected at a first open end thereof to said first aperture to establish air exchange between said first open end and a second open end of said breather tube through said exhaust tube.

3. The apparatus of claim 2, further comprising a removable mouthpiece attached to said second open end of said breather tube.

4. The apparatus of claim 3, wherein said mouthpiece further comprises at lease one flange that is configured to fit in between a plurality of teeth and allow said mouthpiece to be secured.

5. The apparatus of claim 3, wherein said removable mouthpiece forms an air-tight connection to said second open end of said breather tube.

6. The apparatus of claim 3, wherein an outer surface of said second open end of said breather tube has at least one ridge, and wherein said mouthpiece has at least one groove on an inner surface of the mouthpiece that mates to said ridge.

7. The apparatus of claim 1, wherein said filter receiver further comprises at least one perforation to allow air exchange.

8. The apparatus of claim 1, wherein said first wing and said second wing are configured to be adjustable to conform to different inner dimensionalities of various helmets.

9. The apparatus of claim 1, wherein said replaceable first and second filters further comprise an air inlet for receiving ambient air and an air outlet for transferring filtered air through said intake check valve into said mouthpiece.

10. The apparatus of claim 9, wherein said intake check valve is disposed perpendicularly adjacent to a top of said first aperture and is configured to open and allow unidirectional ingress of filtered air through said intake check valve into said mouthpiece during an inhale phase, wherein said exhaust check valve is configured to be closed.

11. The apparatus of claim 9, wherein said exhaust check valve is disposed perpendicularly adjacent to a bottom of said first aperture and is configured to open and allow unidirectional egress of exhaled air through said exhaust check valve into said exhaust tube and vent during an exhale phase, wherein said intake check valve is configured to be closed.

12. The apparatus of claim 10 or 11, wherein said disposed intake check valve and said disposed exhaust check valve are at a distance to limit intake of exhaled exhaust during said inhale phase.

13. A method for filtering air, comprising:
configuring a shaped body to conform to an inner dimensionality of a helmet and/or to conform to a contour of a user's face, wherein said body comprises an air-exchange assembly having an exhaust tube with an open end and a closed end, two wings on opposite sides of said exhaust tube, an intake check valve and an exhaust check valve inside said exhaust tube; a filter receiver attaching to said air exchange assembly, a first replaceable filter surrounding said filter receiver; and a second replaceable filter placing inside said filter receiver; wherein said exhaust tube includes a first aperture in a side of a wall of the exhaust tube near said closed end, second aperture in another side of the wall of the exhaust tube connecting to said first wing, and third aperture in another side of the wall of the exhaust tube connecting to said second wing;
disposing said intake check valve and said exhaust check valve perpendicularly to said exhaust tube therein;
disposing the first replaceable filter around said filter receiver;
disposing the second replaceable filter inside said filter receiver;
connecting a breather tube with two open ends therethrough an aperture on a wall of said exhaust tube at the breather tube's first open end;
connecting a removable mouthpiece to said breather tube at one open end to form an air-tight connection;
wherein:
said replaceable first and second filters further comprise an air inlet for receiving ambient air and an air outlet for transferring filtered air through said intake check valve into said mouthpiece;
said intake check valve is disposed perpendicularly adjacent to a top of said first aperture and is configured to open and allow unidirectional ingress of filtered air through said intake check valve into said mouthpiece during an inhale phase, wherein said exhaust check valve is configured to be closed; and
said exhaust check valve is disposed perpendicularly adjacent to a bottom of said first aperture and is configured to open and allow unidirectional egress of exhaled air through said exhaust check valve into said exhaust tube and vent during an exhale phase, wherein said intake check valve is configured to be closed.

14. The method of claim 13, wherein said mouthpiece further comprises at lease one flange that is configured to fit in between a plurality of teeth and allow said mouthpiece to be secured.

15. The method of claim 13, wherein said first and second wings can be adjusted to conform to different inner dimensionalities of various helmets.

16. The method of claim 15, wherein said mouthpiece can be adjusted to be closer to said air-exchange assembly or to be further away from said air-exchange assembly to conform to different inner dimensionalities of various helmets.

17. The method of claim 13, wherein said intake check valve and said exhaust check valve are disposed at a distance to limit intake of exhaled exhaust during said inhale phase.

* * * * *